(12) United States Patent
Stuiber et al.

(10) Patent No.: US 11,390,202 B2
(45) Date of Patent: Jul. 19, 2022

(54) FITTING FOR MOTOR-VEHICLE INTERIOR

(71) Applicant: GRAMMER AG, Ursensollen (DE)

(72) Inventors: Martin Stuiber, Stulln (DE);
Maximilian Kotz, Rieden (DE)

(73) Assignee: GRAMMER AG, Ursensollen (DE)

( * ) Notice: Subject to any disclaimer, the term of this patent is extended or adjusted under 35 U.S.C. 154(b) by 801 days.

(21) Appl. No.: 16/191,647

(22) Filed: Nov. 15, 2018

(65) Prior Publication Data

US 2019/0145458 A1    May 16, 2019

(30) Foreign Application Priority Data

Nov. 16, 2017 (DE) .......................... 102017010592.8

(51) Int. Cl.
*B60N 2/75* (2018.01)
*F16C 11/04* (2006.01)

(52) U.S. Cl.
CPC ............. *B60N 2/753* (2018.02); *B60N 2/767* (2018.02); *F16C 11/04* (2013.01)

(58) Field of Classification Search
CPC ......... B60N 2/753; B60N 2/767; F16C 11/04; A47C 7/541; A47C 7/543
See application file for complete search history.

(56) References Cited

U.S. PATENT DOCUMENTS

| | | | | |
|---|---|---|---|---|
| 4,659,135 A | * | 4/1987 | Johnson | .................... B60N 2/77 296/153 |
| 4,674,790 A | * | 6/1987 | Johnson | ................. B60N 2/763 296/153 |
| 6,033,015 A | | 3/2000 | Husted | |
| 6,565,156 B1 | * | 5/2003 | Yamashita | ............. A47C 1/026 297/354.12 |
| 6,805,513 B2 | * | 10/2004 | Marquina | .............. B60N 2/224 403/107 |
| 7,108,318 B2 | | 9/2006 | Himmelhuber et al. | |
| 7,185,952 B1 | | 3/2007 | Chen et al. | |
| 7,284,799 B2 | * | 10/2007 | Chung | ................... B60N 2/767 297/411.38 |
| 8,943,650 B2 | | 2/2015 | Anderson et al. | |
| 2012/0242131 A1 | | 9/2012 | Nuss | |

FOREIGN PATENT DOCUMENTS

| | | | | |
|---|---|---|---|---|
| CN | 2875875 Y | * | 3/2007 | ............... B60N 2/28 |
| CN | 204805307 U | | 6/2015 | |
| CN | 205523815 U | | 5/2016 | |
| DE | 10008952 A | | 9/2001 | |

(Continued)

*Primary Examiner* — David R Dunn
*Assistant Examiner* — Tania Abraham
(74) *Attorney, Agent, or Firm* — Andrew Wilford

(57) ABSTRACT

The invention relates to a fitting (10) for a vehicle interior comprising a base (11) and comprising a pivotable part (12) that is pivotable relative to the base about a pivot axis (a) between a first position and a second position, comprising a brake (20) with a first sliding structure (23) on the base (11) having at least one first slide surface (21) and a second sliding structure (25) on the arm support (12) having at least one second slide surface (22), wherein the second slide surface (22) is motion-connected to the arm support (12).

Figure 1:
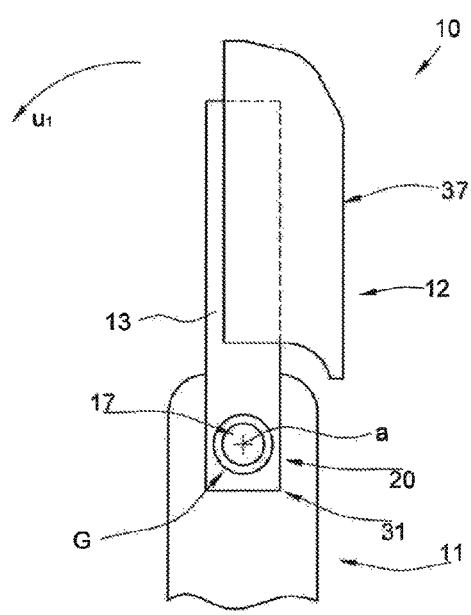

The particular feature is that the first slide surface (21) and/or the second slide surface (22) is formed at least partially as a ramp (24).

10 Claims, 4 Drawing Sheets

(56) References Cited

FOREIGN PATENT DOCUMENTS

| | | | |
|---|---|---|---|
| DE | 10008952 A1 | 9/2001 | |
| DE | 10214469 A | 10/2003 | |
| DE | 10214469 A1 | 10/2003 | |
| DE | 102004005569 A1 | 8/2005 | |
| DE | 202006009880 U1 | 11/2006 | |
| DE | 202012101892 U1 * | 7/2012 | ............. A47C 7/543 |

* cited by examiner

FITTING FOR MOTOR-VEHICLE INTERIOR

FIELD OF THE INVENTION

The invention relates to a fitting a vehicle interior. Vehicle in the sense of the invention is a land vehicle, aircraft or water craft.

BACKGROUND OF THE INVENTION

DE 100 08 952 A1 describes an armrest with a device for maintaining a constant pivoting force.

An armrest is known from DE 102 14 469 A1 with an overload coupling. A first latch element fixed to the arm support and a second latch element fixed to the vehicle are provided on the axis of rotation of the armrest. As a result of the frictional connection between the latch elements, the arm support is held in the set and locked position. An adjustment of the armrest is made via a releasable latch. In the event of overload, slippage occurs between the two latch elements.

OBJECT OF THE INVENTION

It is the object of the invention to provide a fitting with a pivotable part in which the pivotable part is braked by a device in such a manner that during a pivoting process from a first end position into a second end position, it moves in a slowed manner into the second end position. The opposite movement on the other hand should take place easily.

SUMMARY OF THE INVENTION

The fitting comprises a base and a part pivotable about a pivot axis between a first end position and a second end position relative to the base.

The fitting comprises a brake having at least one first slide surface on the base and at least one second slide surface on the arm support. The second slide surface is motion-connected to the arm support. The first slide surface and the second slide surface are at least partially in contact. The first slide surface is on a first sliding structure and the second slide surface is on a second sliding structure. The first sliding structure and the second sliding structure can for example each have more than one slide surface.

The first slide surface and/or the second slide surface are, for example at least partially configured as a ramp. This means that it ascends from a lower level that is designated hereinafter as zero level, e.g. in a direction parallel to the pivot axis and to the other sliding structure. The ascent can be constant or alternatively non-constant, i.e. of increasing or decreasing slope angle. The ramp can alternatively also have constant and non-constant sections. The ramp can, for example, merely form a region of the slide surface. Alternatively the slide surface can, for example, exclusively be configured as a ramp.

During a movement of the pivotable part in a first direction, wherein a projection of a sliding structure moves up the ramp of the other sliding structure, the downhill force counteracts movement so that the pivotable part is braked. During movement of the pivotable part in a second direction opposite to the first direction, the projection is moved down the ramp wherein the downhill force assists movement. If the pivotable part is, for example, an arm support, during a movement of the arm support from an approximately vertical position into an approximately horizontal position, the projection can move up the ramp and during a movement from an approximately horizontal position into an approximately vertical position, it can move down the ramp.

The first sliding structure and/or the second sliding structure comprises, for example, at least two slide surfaces. A stable structure is thus ensured and tilting is avoided. The first sliding structure and/or the second sliding structure comprises, for example, three slide surfaces.

At least one of the slide surfaces comprises, for example, at least one projection that projects relative to the zero level. The projection is, for example, the maximum projecting part of the slide surface. The projection is, for example, in contact with the slide surface of the other sliding structure. If the projection is, for example, part of the first slide surface, it is in contact with the second slide surface.

The first slide surface and/or the second slide surface form, for example, a sliding track on which rides the projection of the other slide surface during movement of the arm support between the first end position and the second end position. The sliding track of at least one of the sliding structures can, for example include a zero level and/or a ramp and/or a projection.

In a first region of movement of the pivotable part, for example, a projection of a slide surface is in contact with the zero level of another slide surface. In other words, the projection of one sliding structure and the zero level of the other sliding structure are located in a nested arrangement. In this region the frictional force is constant assuming a constant force of the spring.

In a second region of movement of the arm support, for example, the projection of at least one slide surface of a sliding structure contacts a ramp of at least one slide surface of the other sliding structure. In this region of the sliding track the frictional force is constant assuming a constant force of the spring if the ramp has a constant ascent. However, the frictional force is greater in relation to the first region. The frictional force can be increasing or decreasing if the ramp does not have a constant ascent.

In a third region of movement of the arm support, for example, the projections of the slide surfaces of the first and the second sliding structures contact each other. In this region, the frictional force is constant assuming a constant force of the spring.

The ramps extend, for example, between the zero level and the projection of the first and/or second slide surface.

The brake comprises, for example, a spring that loads the first slide surface and second slide surface with respect to one another. The spring deflection, i.e. the deflection of the spring is proportional to a spring force of the spring that acts on the slide surfaces and influences the frictional force between the first slide surface and the second slide surface. The spring can comprise one or more springs.

The spring can be configured so that the spring force increases with increasing spring deflection. According to one alternative, the spring can be configured in such a manner that the spring force increases only negligibly with increasing spring deflection. The spring force can then be assumed to be constant. The armrest comprises, for example, a controller for controlling the spring deflection of the spring. The controller comprises first control structures connected to the arm support with at least one first control surface and axially displaceable second control structures that are rotationally fixed with respect to the base with at least one second control surface that cooperates with the first control surface. In this connection, the feature "axially displaceable" can for example mean that the second control structures are displaceable in a direction parallel to the pivot axis.

The controller controls, for example, the spring deflection of the spring depending on the pivot position of the pivotable part in such a manner that in the second region of movement of the pivotable part, the spring force of the spring is increased when the pivotable part is moved in a first direction and is decreased when the pivotable part is moved in a second direction opposite to the first direction.

According to one embodiment of the invention, the first slide surface at least partially forms the first control surface and the second slide surface at least partially forms the second control surface. The first sliding structure is at the same time the first control structure and the second sliding structure is at the same time the second control structure. In other words, the first slide surface and the second slide surface are configured in such a manner that they are also provided with a control function.

The first slide surface and the second slide surface receive the control function, for example, whereby the first slide surface and/or the second slide surface are formed in a direction parallel to the pivot axis as a ramp that has different levels, i.e. they project or run backward by different distances along the sliding track in relation to a zero level.

The controller comprises, for example, a control member to which the first or the second control structure is assigned and that cooperates with the spring. The control structure is, for example, formed on the control member or fastened thereon. If at least one of the sliding structures is at the same time a control structure, the sliding structure is then, for example, on the control member.

In the first region of movement of the pivotable part, the spring displacement transferred by the control member to the spring is lowest. In the second region in which the projections are in contact with the ramps, the control member moves increasingly toward the spring so that the spring displacement is increased. In the third region in which the projection of the first and second sliding structure are in contact, the spring is deflected furthest by the control member and the spring displacement is greatest.

The control member is formed, for example, by the pivotable part. The pivotable part is moved, for example by the controller depending on the position of the arm support in such a manner relative to a spring mounted firmly on one side that the spring displacement and therefore the spring force increases or decreases.

The control surfaces are mounted, for example, coaxially to the pivot axis.

The slide surfaces or the sliding tracks are also mounted, for example coaxially to the pivot axis.

The first slide surface and the second slide surface are, for example, mounted opposite in relation to an axis that is parallel to the pivot axis.

The fitting forms for example an armrest, wherein the pivotable part is an arm support that is pivotable between an approximately vertical position and an approximately horizontal position. The armrest is intended for a seat. This can, for example, be a vehicle seat. The armrest can be fastened directly to the seat. Alternatively it can be fastened on a structure separate from the seat and provided in the vicinity of the seat. For example, the armrest can be part of a console provided between vehicle seats. In the upper end position a longitudinal axis of the arm support is aligned, for example, approximately vertically and in the lower end position the longitudinal axis is aligned approximately horizontally.

BRIEF DESCRIPTION OF THE INVENTION

Figure 2:
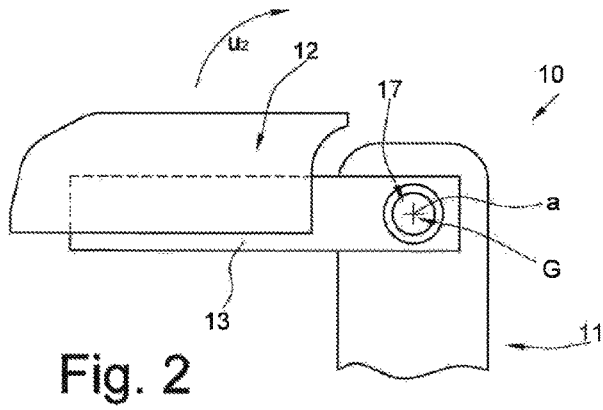
Figure 3:
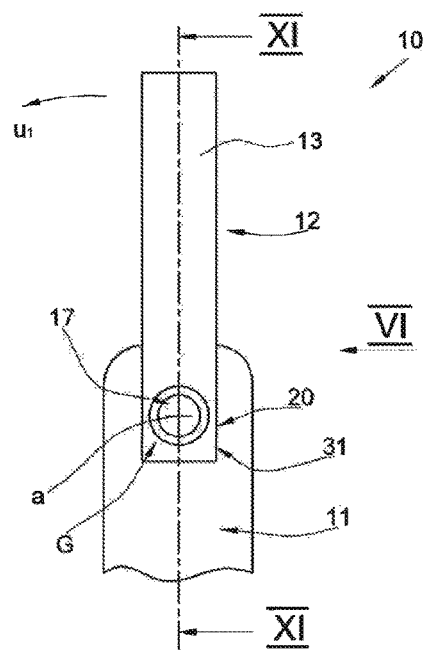
Figure 4:
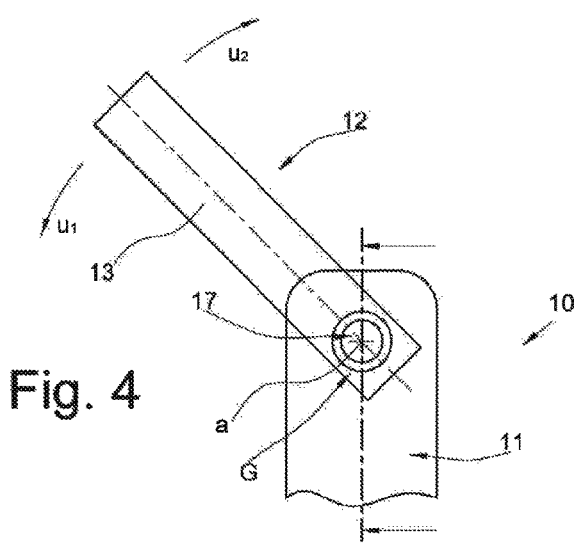
Figure 5:
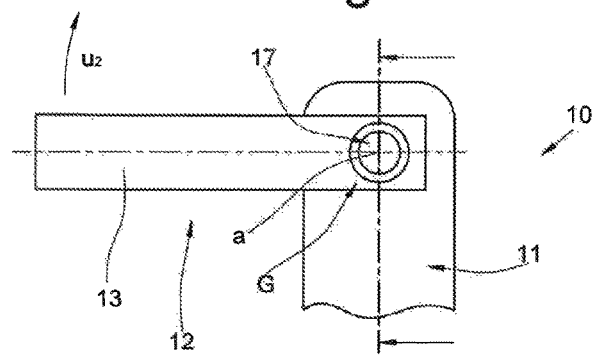
Figure 6:
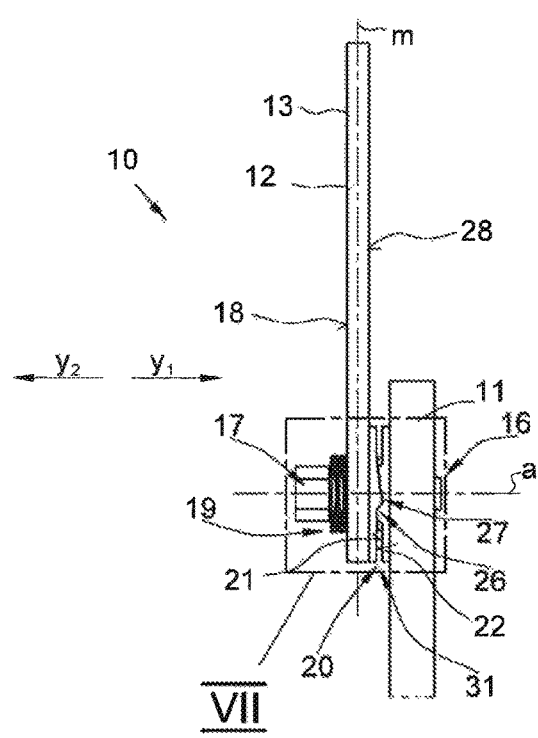
Figure 8:
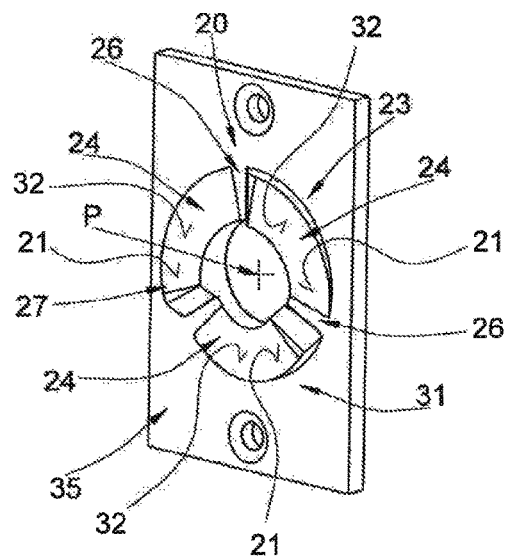
Figure 7:
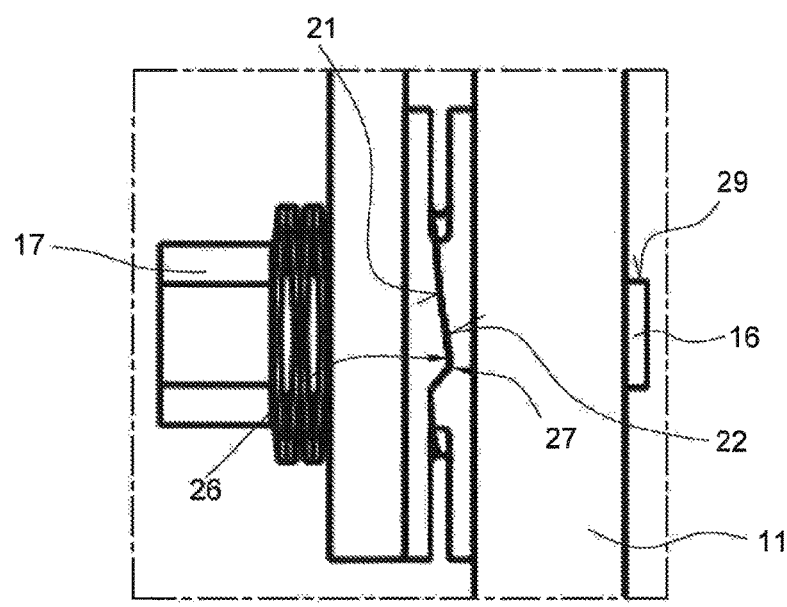
Figure 9:
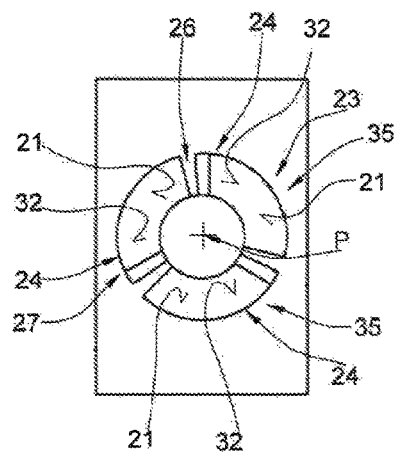
Figure 9A:
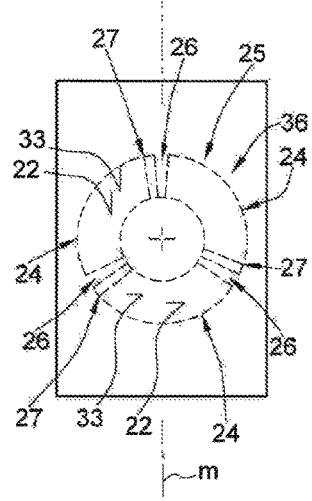
Figure 9B:
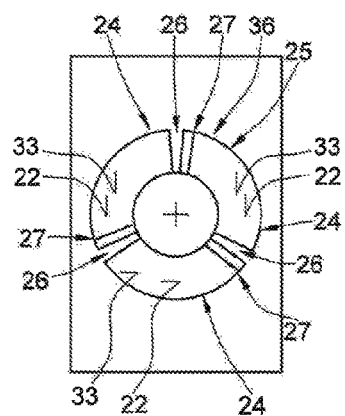
Figure 10:
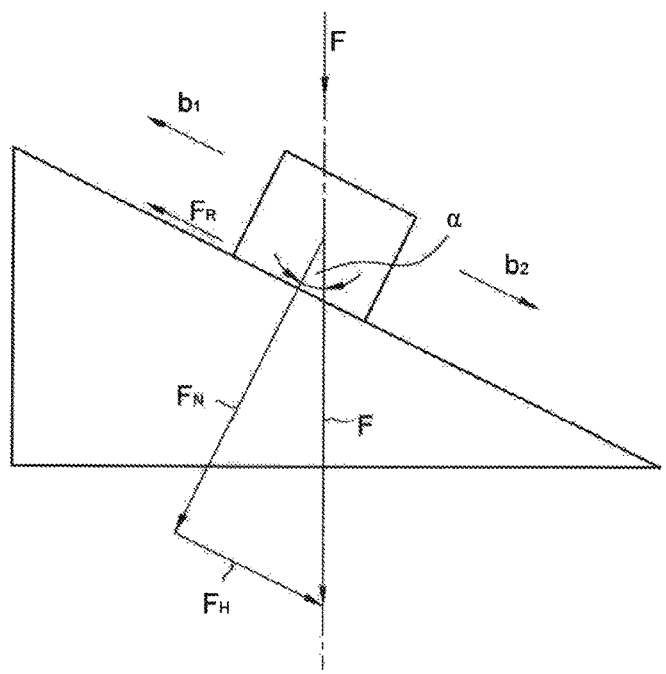
Figure 11:
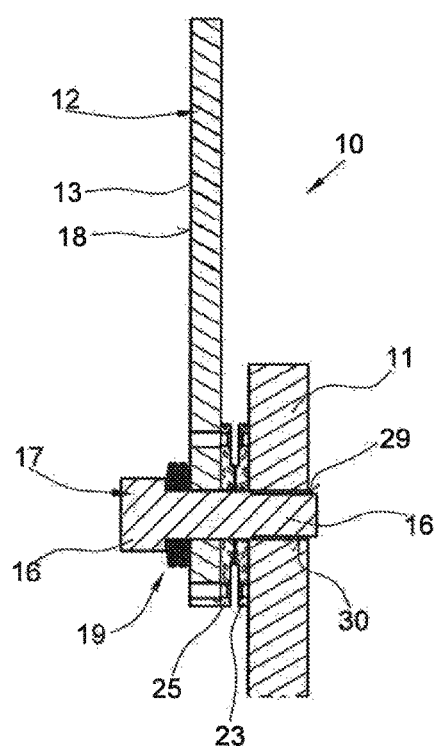
Figure 12:
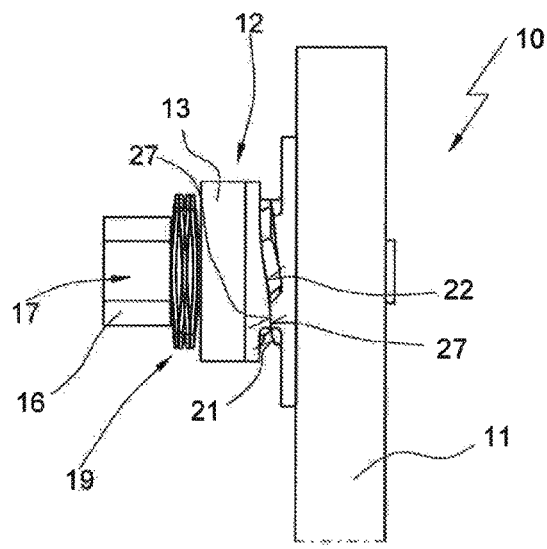
Figure 13A:
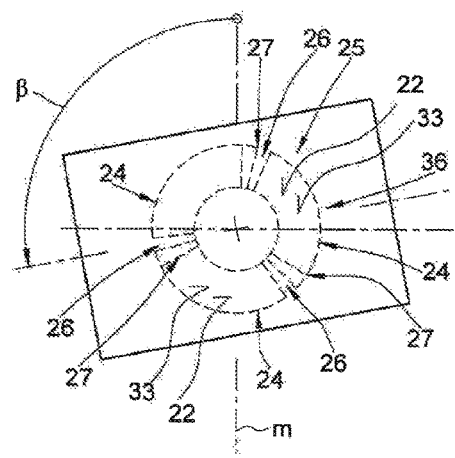
Figure 13B:
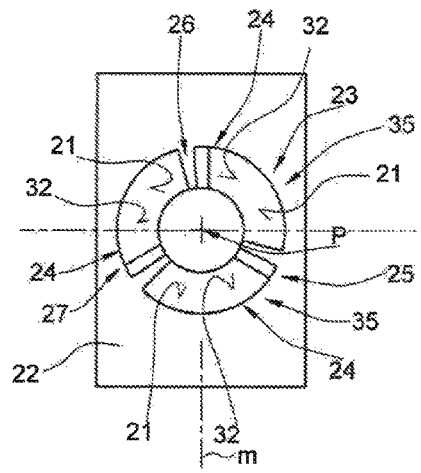
Figure 13C:
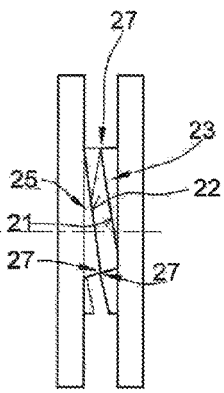

Further advantages of the invention are seen by reference to the description of an embodiment shown in the schematic figure. In the figures:

FIG. 1 is a side view of the armrest, wherein an arm support is in the upper end position, FIG. 2 is a side view of the armrest, wherein an arm support is in a lower end position, FIG. 3 is a side view of the armrest, wherein an upholstery of the armrest is not shown and wherein a supporting arm of the arm support is provided in the upper end position, FIG. 4 shows like FIG. 3 a side view of the armrest, wherein a supporting arm of the arm support is provided in an intermediate position between the upper end position and the lower end position, FIG. 5 is like FIG. 3 a side view of the armrest, wherein a supporting arm of the arm support is provided in the lower end position, FIG. 6 is a back view of the armrest, wherein the supporting arm is located in the upper end position, FIG. 7 is an enlarged view of the section according to the sectional line VII in FIG. 6, FIG. 8 is a perspective individual part view of a sliding element of the brake with a sliding structure, FIG. 9 is a front view of the sliding element of the base according to FIG. 8, FIG. 9a is a front view of a counter-element of the arm support, FIG. 9b is a rear view of the counter-element, wherein the frictional structure is shown by the dashed lines, FIG. 10 is a schematic diagram of a ramp with a body located on the skew plane, FIG. 11 is a sectional view according to the line of intersection XI-XI in FIG. 3, FIG. 12 is like FIG. 6 a rear view of the armrest, wherein the supporting arm is located in the lower end position, FIG. 13a is a rear view of the counter-element according to FIG. 9b, wherein the counter-structure is pivoted according to the maximum pivot angle of the supporting arm by the angle in relation to FIG. 9b, FIG. 13b is a diagram of the sliding element according to FIG. 9, and FIG. 13c is a view of the cooperating sliding structures in the lower end position of the supporting arm.

SPECIFIC DESCRIPTION

An armrest overall is designated in the figures with the reference number 10. The same reference numbers in the various figures designate corresponding parts even if small letters are added or omitted.

The armrest 10 comprises according to FIGS. 1 and 2 a base 11 and an arm support 12 with a supporting arm 13 pivotable about a pivot axis a between an upper end position and a lower end position. The supporting arm 13 forms the pivotable part in the sense of the invention. In the upper end position, a longitudinal axis m of the arm support 12 is approximately vertical and in the lower end position, the longitudinal axis m is approximately horizontal. The lower end position is for example a usage position and the upper end position is for example a non-usage position.

In FIGS. 3 to 10, the supporting arm 13 of the arm support 12 is shown without an upholstery 37. From the upper end position (see FIG. 3) the supporting arm 13 can be moved in the direction $u_1$ toward the lower end position. From the lower end position the supporting arm 13 can be moved in the direction $u_2$ toward the upper end position. FIG. 4 shows an intermediate position between the upper end position and the lower end position. The supporting arm 13 forms with the base 11 a pivot G.

It comprises a free end region 14 remote from the pivot G and an end region 15 close to the pivot G. The pivot axis a is formed in the present embodiment by a pin 16 on which the supporting arm 13 can be moved rotationally in the directions $u_1$ and $u_2$ and is mounted axially movable in the directions $y_1$ and $y_2$.

During movement from the upper end position into the lower end position, the arm support 12 is braked by a brake 20. The brake 20 comprises a first sliding structure 23 on the base 11 with slide surfaces 21 (see FIG. 6) and a second sliding structure 25 on the arm support 12 with slide surfaces 22. A spring 19 comprising a plurality of disk springs is provided on the pin 16 between a head 17 of the pin 16 and an outer surface 18 of the supporting arm 13. The spring 19 is part of the brake 20.

It can be seen in FIG. 6 that a counter-element is fastened to the supporting arm 13 and a sliding element is fastened to the base 11. The counter-element with the slide surface 22 is firmly connected to an outer surface 28 of the supporting arm 13 and the sliding element with the slide surface 21 is firmly connected to the base 11. During movement of the supporting arm 13 or the arm support 12 in the directions $u_1$ and $u_2$, the slide surface 22 therefore rotates relative to the slide surface 21 in the directions $u_1$ and $u_2$. The slide surfaces 21 and 22 are in contact.

The spring 19 presses in the direction $y_1$ against the outer surface 18 of the supporting arm 13 and thus loads the slide surfaces 21 and 22 with respect to one another.

The pin 16 is provided with an external thread 29 that is screwed to an internal thread 30 of the base 11 (only identifiable in FIG. 11). Since the pin 16 is screwed in in the direction $y_1$ or screwed out in the direction $y_2$, the prestress of the spring 19 and therefore the sliding force can be increased or reduced.

FIGS. 8 and 9 show the sliding element with the sliding structure 23 with the slide surfaces 21 in enlarged view. The sliding structure 23 is configured fundamentally according to the sliding structure 25 according to FIG. 9a, which has the slide surfaces 22. If it is now taken into account that the sliding structures 23 and 25 are facing one another, it can be seen from a comparison of FIGS. 9 and 9b that the slide surfaces 21 ascent anticlockwise from a plane or a 4zero level 26 to a ramp, whilst the slide surfaces 22 ascend clockwise from the zero level 26 to a ramp. In FIGS. 9 and 9b the frictional structures 23 and 25 are provided according to their position when the arm support is located in the upper position.

The invention makes use of the principle (see FIG. 10) that a force that impinges upon a surface directed at an angle to the surface normal can be broken down into a normal force (FN) and a force directed parallel to the surface that is designated hereinafter as downhill force (FH). During movement of a body in direction $b_1$, the force FH counteracts movement. During movement of the body in direction $b_2$, the force FH assists movement.

In the present embodiment, the principle is used in such a manner that the projection 27 moves up the ramp 24 during movement of the arm support 12 in the pivot direction $u_1$, wherein the arm support 12 is braked by the downhill force FH. During a movement of the arm support 12 in the direction $u_2$, the projection 27 moves down the ramp 24. Movement of the armrest is thereby assisted by the downhill force FH.

The brake 20 comprises a controller 31 for controlling the frictional force, which comprises a first control structure and a second control structure. In the present embodiment, the slide surfaces 21 are identical to control surfaces 32 of a control structure 35 and the slide surfaces 22 are identical to control surfaces 33 of a control structure 36. In other words, the slide surfaces are at the same time the control surfaces. Each of the control structures 35 and 36 therefore also has three control surfaces 32 or 33. The control surfaces 32 are configured coaxially to a center point P.

Each of the control surfaces 32 and 33 or of the slide surfaces 21 and 22 comprises a region at a zero level 26, a region configured as a ramp 24 and a region of maximum elevation that is designated as projection 27. The ramp 24 and the projection 27 of the sliding structure 23 extend in direction $y_2$ in relation to the zero level 26. The ramp 24 and the projection 27 of the sliding structure 25 extend in direction $y_1$ in relation to the zero level 26. The zero level 26 is the plane from which the elevation extends. A distance 1 is formed between the projection 27 and the zero level 26.

As can be seen in FIG. 6, the sliding structures 23 and 25 are provided in the upper end position of the supporting arm 13 in such a manner that the projections 27 of one sliding structure are provided with respect to the zero level 26 of the other sliding structure. In other words, the projections 27 and the zero levels 26 of the slide surfaces 21 and 22 are provided in a nested manner. This corresponds to the above-mentioned first region of the pivoting movement of the arm support. This arrangement can be identified in FIG. 6 and can be understood by envisaging the sliding structures 23 and 25 of FIGS. 9 and 9b as placed one above the other.

If the supporting arm 13 is pivoted from the upper end position in direction $u_1$, the projections 27 of the slide surfaces 21 move up the ramps 24 of the slide surfaces 22. The projections 27 of the slide surfaces 22 move up the ramps 24 of the slide surfaces 21. This corresponds to the above-mentioned second region of the pivoting movement of the arm support 12. In this case, the sliding structure 25 and the supporting arm 13 are displaced axially in direction $y_2$. The supporting arm 13 is a control member in the sense of the invention.

If the supporting arm 13 is now pivoted from the upper end position by the angle, so that it is provided in the lower end position, as can be seen in FIG. 12, the projections 27 of the sliding structures 23 and 25 are opposite one another. This corresponds to the above-mentioned third region of the pivoting movement of the arm support 12. The sliding structure 25 is then displaced relative to the upper end position by the maximum distance 21 in direction $y_2$. This position is shown in FIGS. 12 and 13c and can be understood by envisaging the sliding structures 23 and 25 of FIGS. 13a and 13b as being placed one above the other. Whereas the sliding structures 23 on the base 11 have not changed their position according to FIG. 13b, the sliding structures 25 according to FIG. 13a have rotated through the angle.

It is clear that during movement of the supporting arm 13 from the upper end position in direction $u_1$ as a result of movement of the projections 27 of one sliding structure onto the ramps 24 of another sliding structure, the sliding force increases. An increase in the frictional force would also occur, other than in the present embodiment, if the spring force were constant.

In the present embodiment, whilst the projections are located on the ramps, the spring force additionally increases as a result of the displacement of the supporting arm 13 in direction $y_2$, with the result that the frictional force between the contacting slide surfaces 21 and 22 also increases continuously. In this case, movement of the arm support 12 in direction $u_1$ is increasingly braked due to the increase in the normal force. The arm support 12 therefore moves in a braked manner into the lower end position. This at least partially compensates the component of the weight force of the arm support 12 that is effective with increasing pivot angle in direction $u_1$.

According to an alternative embodiment, the spring 19 could be configured in such a manner that the increase in the spring force on account of the displacement of the supporting arm 13 is negligible. In this case, the frictional force would increase abruptly when the projections 27 move onto the ramps 24.

If the arm support 12 is pivoted in the reverse direction $u_2$, the projections 27 of one sliding structure move down the ramps 24 of another sliding structure. The downhill force now assists movement of the arm support 12 in direction $u_2$, i.e. it acts in the same direction as the force to be applied to move the arm support 12. Since the supporting arm 13 moves in direction $y_1$ the spring deflection is reduced and therefore the spring force. The frictional force is thereby reduced.

The sliding structures 23 and 25 can alternatively also be configured in such a manner that the projection 27 only moves onto the ramps 24 after the arm support 12 has been pivoted from the upper end position about a defined pivot angle in direction $u_1$. In this case, the increase in the frictional force only begins after performing the pivoting movement about the defined pivot angle.

The invention claimed is:

1. A fitting for a vehicle interior, the fitting comprising:
a base;
a part pivotable relative to the base about a pivot axis between an upper position and a lower position;
a first sliding structure on the base and having a first slide surface;
a second sliding structure on the part and having a second slide surface coupled to the part, one of the slide surfaces being formed with a projection and also being configured at least partially as a ramp;
another projection on the other of the slide surfaces; and
a spring urging the other projection of the other slide surface against the one slide surface or ramp, the other projection riding on the ramp and braking movement of the part on movement from the upper position to the lower position such that in a region of movement of the part, the projections are in direct engagement.

2. The fitting according to claim 1, wherein the one slide surface forms a sliding track on which rides the projection of the other sliding structure during movement of the pivotable part between the upper position and the lower position.

3. The fitting according to claim 1, wherein, in a region of movement of the part, the projection of the first slide surface and the ramp of the one slide surface are in direct engagement.

4. The fitting according to claim 1, further comprising:
a controller for controlling a normal force acting between the slide surfaces and comprising at least one axially displaceable first control structure rotationally connected to the part having at least one first control surface and a second control structure that is rotationally fixed relative to the base having at least one second control surface that cooperates with the first control surface.

5. The fitting according to claim 4, wherein the first slide surface at least partially forms the second control surface and the second slide surface at least partially forms the first control surface.

6. The fitting according to claim 4, wherein the first control structure or the second control structure is on a control member for adjusting deflection of the spring.

7. The fitting according to claim 6, wherein the control member is formed by the pivotable part.

8. The fitting according to claim 1, wherein the slide surfaces are coaxial with the pivot axis.

9. The fitting according to claim 1, wherein the fitting forms an armrest and the part is an arm support pivotable between an upright position and a horizontal position.

10. A fitting for a vehicle interior, the fitting comprising:
a base;
a part pivotable relative to the base about a pivot axis between an upper position and a lower position;
a first sliding structure on the base and having a first slide surface;
a second sliding structure on the part and having a second slide surface coupled to the part, one of the slide surfaces being configured at least partially as a ramp;
a projection on the other of the slide surfaces; and
a spring urging the projection of the other slide surface against the one slide surface or ramp, the projection riding on the ramp and braking movement of the part on movement from the upper position to the lower position such that in a region of movement of the part, the projection of the other slide surface and at least one zero level of the one slide surface are in direct engagement.

* * * * *